United States Patent [19]

Lamb

[11] Patent Number: 4,748,307
[45] Date of Patent: May 31, 1988

[54] TUBE FURNACE

[75] Inventor: John G. Lamb, Harlow, England

[73] Assignee: STC PLC, London, England

[21] Appl. No.: 858,617

[22] Filed: May 1, 1986

[30] Foreign Application Priority Data

May 4, 1985 [GB] United Kingdom ................ 8511422

[51] Int. Cl.$^4$ ............................................... H05B 6/30
[52] U.S. Cl. ................................ 219/10.49 R; 428/36
[58] Field of Search ............... 65/2, 13; 156/DIG. 83; 219/10.41, 10.49 R, 121 L, 121 LE, 121 LF, 121 LM; 373/139, 155–157; 422/248, 249; 428/36; 432/262, 264

[56] References Cited

U.S. PATENT DOCUMENTS 3,943,324  3/1976  Haggerty .................. 219/121 LT X
4,450,333  5/1984  Andrejco et al. ............. 219/10.49 R

OTHER PUBLICATIONS

WO 83-04364; International Publication Date: Dec. 8, 1983; Applicant: Western Electric Co., Inc.

Primary Examiner—Mark J. Thronson
Attorney, Agent, or Firm—Lee, Smith & Zickert

[57] ABSTRACT

The evolution of particulate material from the inner surface of a tubular zirconia susceptor while fibre is drawn from preform is inhibited by providing that surface with a glassy finish by laser-beam fusion.

1 Claim, 1 Drawing Sheet

U.S. Patent  May 31, 1988  4,748,307
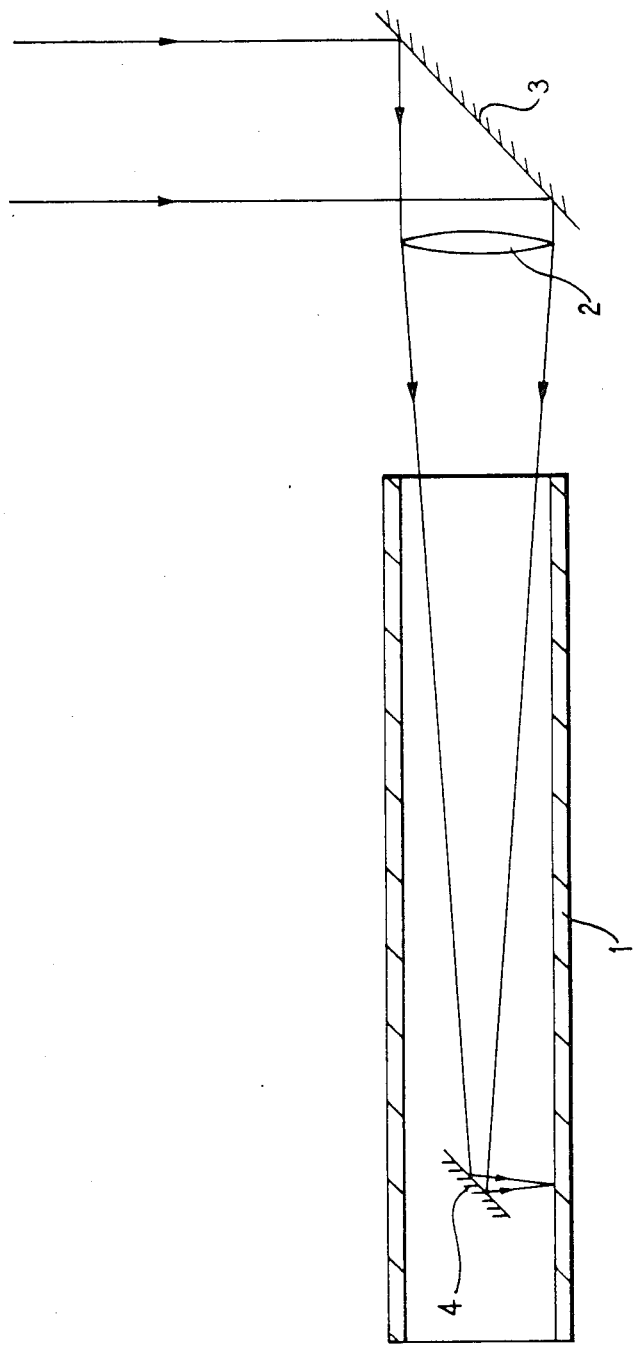

TUBE FURNACE

This invention relates to tube furnaces for the drawing of glass optical fibre from optical fibre preform.

A furnace is required to heat-soften the tip of the preform sufficiently to enable it to be drawn into fibre. For the drawing of silica fibres this requires a temperature in the region of 2000° C. The strength of the resulting fibre is very much reduced if, during the drawing operation, its surface becomes contaminated by particulate material dislodged from the furnace. Laser heating provides a particularly clean environment for drawing, but associated with this heating method are problems of providing adequate uniformity of distribution and adequate total power. An alternative heating method, where higher power levels and greater uniformity are more readily attainable, is provided by r.f. induction heating using a zirconia susceptor tube. It is found however, that in the course of use particles of zirconia become dislodged from the susceptor, and some of these land on the fibre to produce undesirable defects. One method designed for overcoming this problem of particle evolution is described in PCT Specification No. WO 83/04364. This involves the application of a layer of different material to the inner surface of the susceptor. The present invention is concerned with an alternative method of preventing particle evolution, and is distinguished by the fact that no foreign material is applied to the susceptor surface, and hence there is no risk of the formation of undesirable eutectics, and also no risk of conflicting chemical properties between the susceptor and a coating applied thereto.

According to the present invention there is provided a zirconia tubular susceptor part or all of whose inner surfaces has been rendered glassy by laser beam induced fusion.

BRIEF DESCRIPTION OF THE DRAWINGS

There follows a description of the manufacture of a zirconia susceptor embodying the invention in a preferred form. The description refers to the accompanying drawing which schematically depicts the optical system employed for laser-beam fusion of the inner surface of a susceptor tube.

Commercially available zirconia susceptor tubes have a generally white matt appearance, and it is believed they are generally made by a process involving the at least partial sintering of a powder compact. The particular susceptor tube of the accompanying drawing is one made by plasma spraying zirconia particles on to a mandrel, and then heat treating the product to produce partial sintering.

Referring now to the drawing, such a tube 1, which is typically about 200 mm long, 40 mm in diameter, and has a wall thickness of about 1.5 mm, is mounted for rotation about its longitudinal axis for laser beam fusing its inner surface over at least a portion of its length. Fusing over the full length is not necessary if the r.f. field geometry is such that significant power does not couple into the tube extremities.

About 0.20 kw of light from a $CO_2$ laser (not shown) is focussed with a lens 2 down to a spot size of about 1 mm, and a first mirror 3 is angled to direct the light down the axis of the tube 1, while a second mirror is angled to deflect it again to strike the inside wall of the tube squarely on in the focal plane. The tube is rotated about its axis so that the focussed laser beam is traversed across the inner surface of the susceptor at a rate of about 2 meters per minute. After each rotation the tube is advanced longitudinally by about 0.5 mm so that in this way fusion proceeds in a series of overlapping rings. Alternatively a continuous longitudinal traverse could be used so that the laser spot tracks a helical path across the inner surface of the susceptor.

It is to be clearly understood that the quoted values of laser power, spot size, and rate of traversal are given only by way of example of typical parameters that provide sufficient energy input to provide adequate fusion, but not so much energy as to cause problems associated with excessive thermal shock. Problems of thermal shock are also lessened by choosing a relatively thin wall-thickness for the susceptor tube. In situations where a more substantial susceptor wall thickness is required in order to provide efficient coupling of adequate r.f. power, use may be made of two or more nested susceptor tubes, where only the innermost needs to have its inner surface rendered glassy by fusion with the laser beam.

What is claimed is:

1. A tubular susceptor composed of particles of zirconia partially sintered together, in which over at least a portion of the axial length of the tube a region confined to an inner surface layer of the tube has been rendered glassy by laser beam induced fusion of the zironia particles, said inner surface being backed by material that remains in the form of particles of zirconia partially sintered together.

* * * * *